(12) United States Patent
Gemin et al.

(10) Patent No.: US 7,603,864 B2
(45) Date of Patent: Oct. 20, 2009

(54) BLADE TIP ELECTRIC MACHINE

(75) Inventors: Paul Robert Gemin, Cincinnati, OH (US); KiYoung Chung, West Chester, OH (US)

(73) Assignee: General Electric Company, Schenectady, NY (US)

( * ) Notice: Subject to any disclaimer, the term of this patent is extended or adjusted under 35 U.S.C. 154(b) by 560 days.

(21) Appl. No.: 11/564,504

(22) Filed: Nov. 29, 2006

(65) Prior Publication Data

US 2008/0120980 A1    May 29, 2008

(51) Int. Cl.
*F02C 6/00* (2006.01)

(52) U.S. Cl. ............ 60/802; 290/1 A; 416/146 R

(58) Field of Classification Search ............ 60/792, 60/801, 802, 805; 290/52, 1 A, 1 R, 55, 54; 416/146 R, 229 R, 230
See application file for complete search history.

(56) References Cited

U.S. PATENT DOCUMENTS

| | | | |
|---|---|---|---|
| 2,547,934 A | | 4/1951 | Gill |
| 2,853,638 A | | 9/1958 | Bonnano et al. |
| 3,424,404 A | | 1/1969 | Rea |
| 3,859,785 A | * | 1/1975 | Leto et al. ............ 60/802 |
| 4,056,748 A | * | 11/1977 | Cross et al. ............ 310/168 |
| 4,309,621 A | | 1/1982 | Litz |
| 4,367,413 A | | 1/1983 | Nair |
| 4,450,361 A | | 5/1984 | Holt |
| 4,720,640 A | | 1/1988 | Anderson et al. |
| 5,376,827 A | | 12/1994 | Hines |
| 6,249,071 B1 | | 6/2001 | Lopatinsky et al. |
| 6,729,140 B2 | | 9/2002 | Care et al. |
| 6,832,486 B2 | | 12/2004 | Care et al. |
| 6,979,925 B2 | | 12/2005 | Schwamm |
| 7,032,859 B2 | | 4/2006 | Mohr |
| 2004/0123603 A1 | * | 7/2004 | Care et al. ............ 60/801 |
| 2005/0140231 A1 | * | 6/2005 | Ogoshi ............ 310/113 |
| 2005/0258694 A1 | * | 11/2005 | Leininger ............ 310/156.32 |
| 2005/0285407 A1 | | 12/2005 | Davis et al. |

FOREIGN PATENT DOCUMENTS

| | | |
|---|---|---|
| CN | 1444324 | 9/2003 |
| RU | 2253737 C2 | 6/2005 |
| WO | 2005059316 A1 | 6/2005 |

* cited by examiner

*Primary Examiner*—Michael Cuff
*Assistant Examiner*—Vikansha S Dwivedi
(74) *Attorney, Agent, or Firm*—McNees Wallace & Nurick, LLC

(57) ABSTRACT

An electromagnetic machine that generates electric power from an engine by having rotor poles on the tips of the fan blade airfoils and stator elements circumferentially placed around the blade airfoils. As the pole tips on the blade airfoils are excited, they rotate past the stator elements, causing a magnetic flux change in the stator. The magnetic flux change results in an electric potential that is used to provide power.

17 Claims, 6 Drawing Sheets

BLADE TIP ELECTRIC MACHINE

FIELD OF THE INVENTION

The present invention relates to electrical machines, and more particularly to electrical machines internal to gas turbine engines.

BACKGROUND OF THE INVENTION

Gas turbine engines such as aero engines are required to generate electrical energy for various purposes within and external to the engine, such as to provide power for control systems or to provide electrical power to an airframe. In currently machines, an electrical generator that supplies electrical power required by the gas turbine engine is driven by a mechanical gearbox. The electrical generator and the mechanical gearbox are mounted within the nacelle of the engine. Current power requirements have caused the size of the electrical generator is increasing to meet the increasing power demands of aircraft. For gas turbine engines that are wing- or fuselage-mounted, the increased size of the electrical generator may require enlarging the nacelle, resulting in increased aircraft drag.

One system provides an electrical machine that operates as a generator or motor, incorporated in a gas turbine engine. The compressor blades may be shrouded at the radially outer end to separate the aerodynamic part of the blades from the electrical rotor projection. Beyond the shroud, an electrical machine is provided by rotor projections attached to the compressor blade. The projections run in a channel of flux cores resulting in an electrical machine, which is external to the combustion gas paths of the engine, for ready access, with optimized magnetic flux paths. The shroud of the blades forms a ring around the outer periphery of the gas path for containment of gases, the shroud having seals between the shroud and the walls of the channel to resist gas leakage around the shroud and into the channel.

Another system provides a mechanical link from a rotating component of the engine to a generator in order to generate enough electrical power to meet the increased demands. Another system, in an attempt to reduce the level of mechanical complexity in the mechanical linkage system, incorporates an electrical generator within the rotating spools of the engine, preferably the high-pressure spool. However, space limitations in the region of the central axis of the engine have been found to be such that this proposal is not wholly satisfactory.

Likewise, another gas turbine engine includes an electrical generator. The generator can also be operated as a motor to provide drive, such as for starting the engine. The engine includes at least one ring of rotating blades. The motor/generator is formed from a rotating part comprising the rotating blade ring, and a fixed part comprising a plurality of coils arranged circumferentially around the blade ring. While this method reduces the complexity of the machine construction, it relies on traditional methods and system for excitation of the fan blades.

Therefore, what is needed is a method and system to utilize gas turbine fan or compressor blades as poles for an integrated electric machine for increased aircraft engine electric power generation within the existing nacelle, while providing a transverse flux electric machine suited to the structure of the fan or compressor blade tips for the excitation of the system.

SUMMARY OF THE INVENTION

The following paragraphs summarize the embodiments of the present invention defined by the independent claims appended hereto. In one embodiment the present invention is directed to a blade tip electric machine having a transverse flux machine, a rotary blade arrangement configured with a plurality of blades and a plurality of rotor pole elements. Each rotor pole element of the plurality of rotor pole elements is disposed on a distal end of one of the plurality of blades. The blade tip electric machine also has a plurality of stator elements, where each stator element of the plurality of stator elements is circumferentially disposed and circumferentially spaced around at least a portion of the circumferential perimeter of the plurality of blades. The blade tip electric machine also has at least one coil element. The transverse flux machine provides the excitation to the rotary blade arrangement, which has a spinning motion and wherein the plurality of rotor elements pass adjacent, as opposed to through, to the plurality of stator elements thereby causing a change in magnetic flux in the at least one coil element.

Another embodiment of the present invention is directed to a gas turbine engine having a low-pressure spool turbine and a high-pressure spool turbine, a compression chamber, a booster combustion chamber, an exhaust system and a rotary blade arrangement, where the rotary blade arrangement has a plurality of blades. The blade tip electric machine also includes a plurality of rotor elements, where each rotor element of the plurality of rotor elements is disposed on a distal end of one blade of the plurality of blades. The invention also includes a plurality of stator elements, where each stator element of the plurality of stator elements is circumferentially disposed and circumferentially spaced around the circumferential perimeter of the plurality of blades. In addition, there is at least one coil element disposed on a stator element of the plurality of stator elements and the gas turbine engine has a rotary blade arrangement with a rotational motion and wherein the rotor elements pass adjacent to the plurality of stator elements thereby causing a change in magnetic flux in the stator elements in the at least one coil element.

One advantage of the present invention is an increase in aircraft engine electric power generation without further increase in nacelle size.

A further advantage of the present invention is improved blade deflection performance.

Yet another advantage of the present invention is the allowance of axial shaft movement without degradation in performance.

Still another advantage of the present invention is the incorporation of the pole with the blade's leading edge and the improved tip construction.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3A is an enlargement of area 3A shown in FIG. 3.

Wherever possible, the same reference numbers will be used throughout the drawings to refer to the same or like parts.

DETAILED DESCRIPTION OF THE INVENTION

Figure 1:
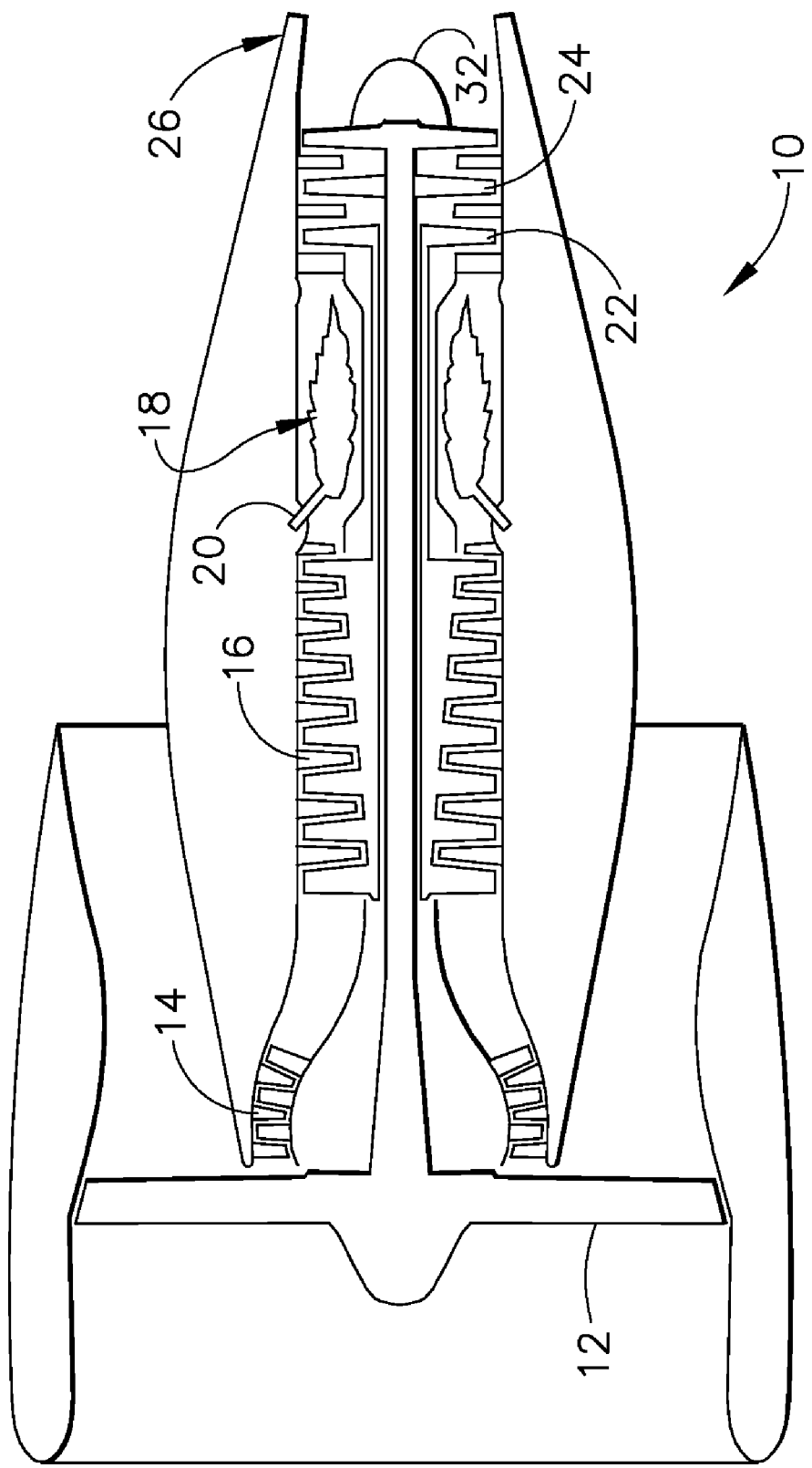
FIG. 1 is a simplified section through a conventional gas turbine engine.

A high bypass aircraft gas turbine engine 10 is shown schematically in FIG. 1. During operation, air is forced through the fan 12. A portion of the air bypasses the core of the engine and is used to contribute to the thrust that propels the engine. A portion of the air is compressed in the booster 14 and compressor 16 portions of the engine up to 10-25 times atmospheric pressure, and is adiabatically heated in the process. This heated and compressed air is directed into the combustor portion of the engine 18, where it is mixed with fuel supplied through a fuel nozzle system 20. The fuel is ignited, and the combustion process heats the gases. These hot gases pass through the high pressure 22 and low-pressure 24 turbines, where rotating discs extract energy to drive the fan and compressor of the engine. Once the hot gases pass through the high-pressure turbines, the hot gases are considered to be core gases, rather than combustion gases. The gases then are passed to the exhaust system 26, which includes the center body 32, where they contribute to thrust for aircraft propulsion.

Figure 2:
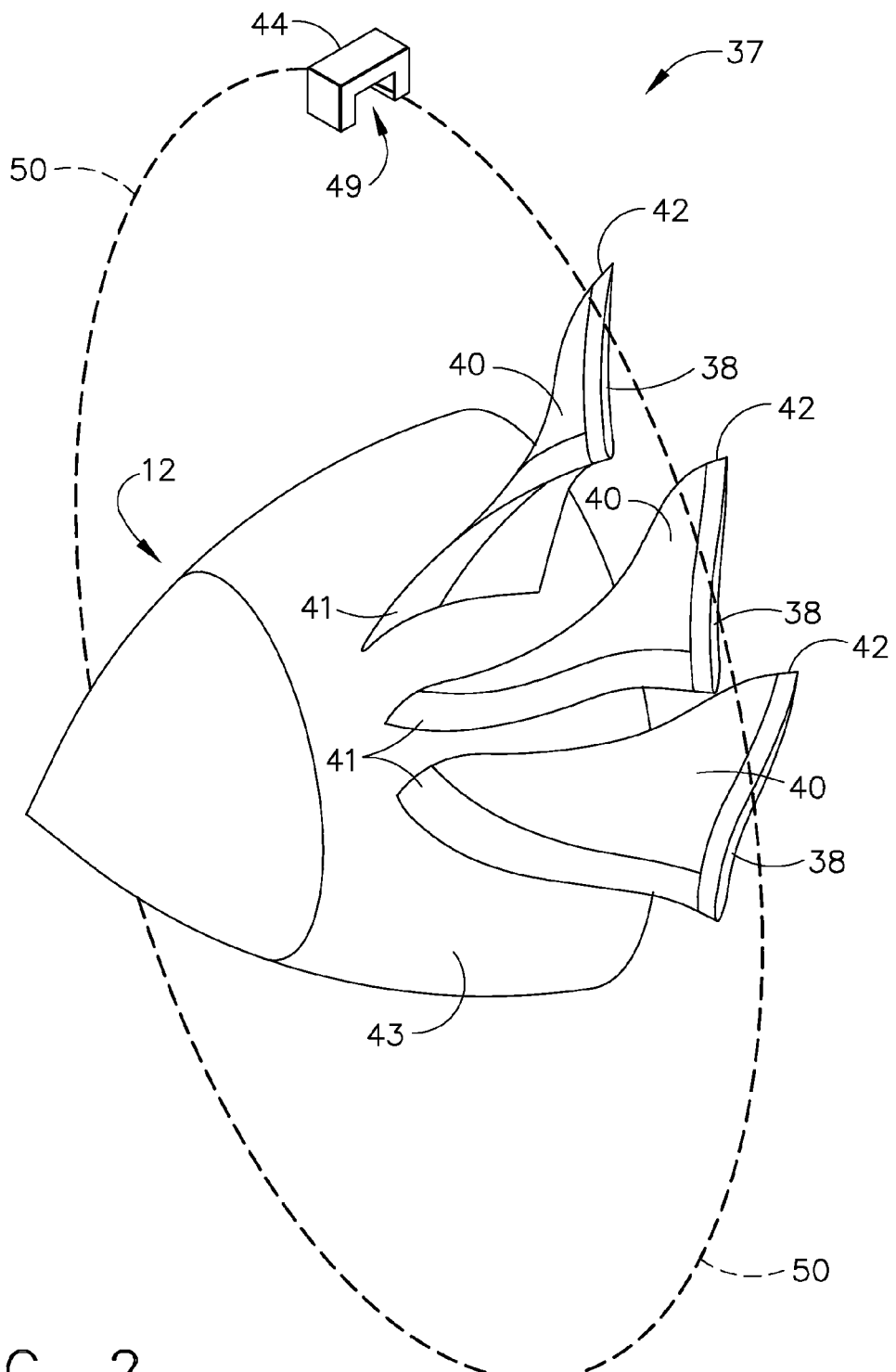
FIG. 2 is a schematic representation of a single-phase coil configuration of the present invention.

FIG. 2 shows a partial schematic view of the front fan assembly 12 including portions of the electric machine 37. For clarity, all of the fan blades 40 and cores 44 are not shown, however it is understood that blades 40 and cores 44 are spaced at regular intervals about the fan periphery. The electric machine 37 has a rotor assembly made up of a plurality of rotor poles 38. The rotor poles 38 are attached to, or formed integrally with, the blades 40. More specifically, the base portion 41 of the blades 40 are connected to a hub 43, with there being conventional means provided at the interface of the blades 40 and the hub 43 to maintain adequate definition of gas flow and to prevent leakage. The blades 40 and the hub 43 may be mounted in a conventional manner on the hub 43, or alternatively, the blades 40 and the hub 43 may be of unitary construction. The fan blades 40 are disposed on the hub 43 such that the leading edges of the blades 40 are directed toward the outside of the electric machine 37 and the stator segments or magnetic cores 44 are angled so that they are aligned with the blade tips 42. Preferably, the blades 40 are unshrouded. The transverse flux machine provides the method of excitation of the electric machine. If the rotor poles 38 are permanent magnets, then no coil 50 excitation is required for electric generation. In addition, if the rotor poles 38 are magnetically permeable, the coils 50 could be excited, as with reluctance machines.

Figure 3:
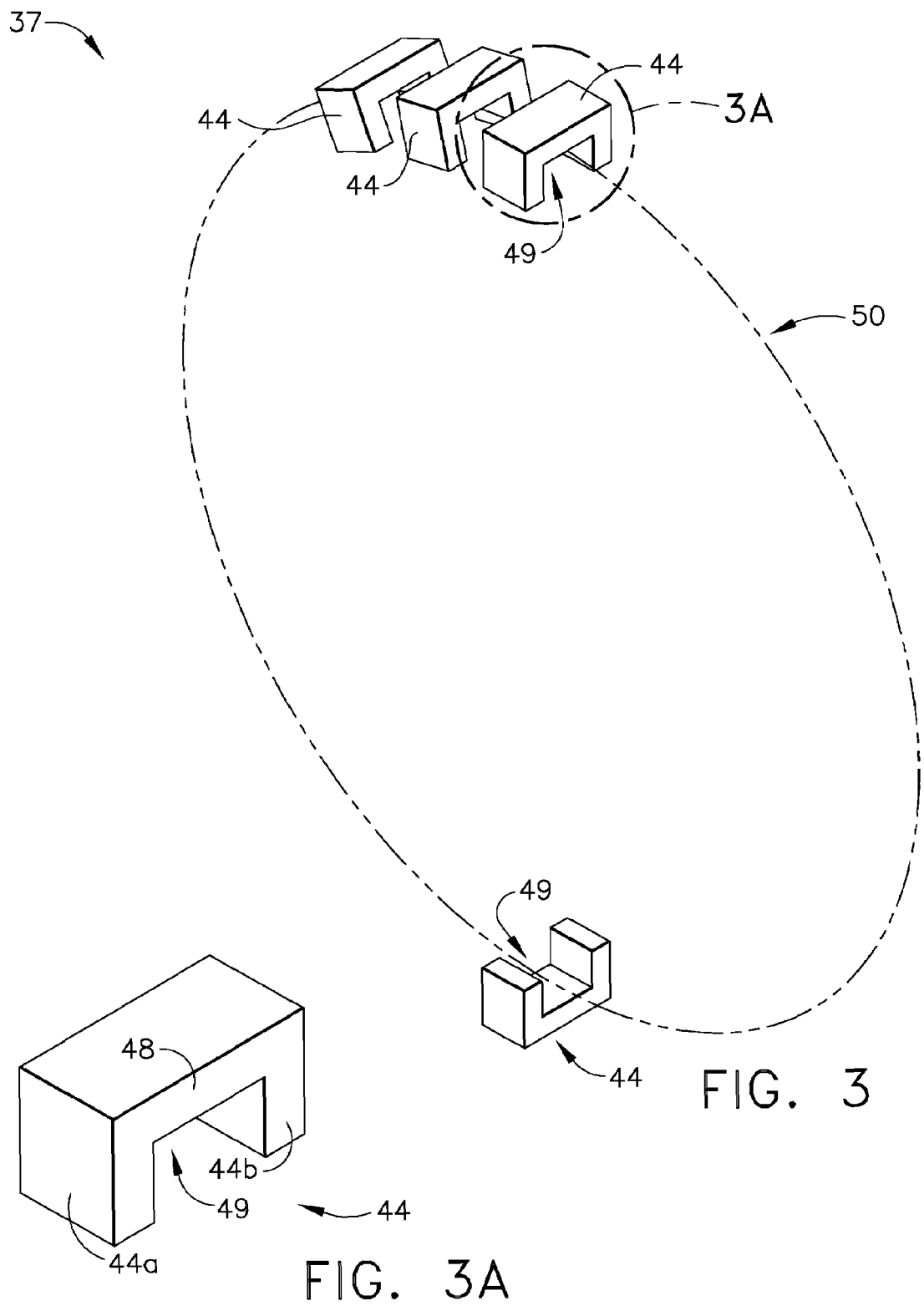
FIG. 3 is a schematic representation of the present invention disposed around the fan assembly of FIG. 1.

Referring next to FIG. 3, in one embodiment, the electric machine 37 has a configuration conventionally referred to as a transverse flux machine. The rotor poles 38 are disposed on the blade tips 42 and are constructed of a magnetically permeable material such as steel, but may be constructed of any magnetically permeable material. A stator assembly includes a series of magnetic cores 44 and a coil 50. Each core 44 is a horseshoe shaped element constructed of a magnetically permeable material. Shown in detail in FIG. 3A, each core 44 has two protruding arms 44a, 44b, extending from a base 48. The arms 44a, 44b of the core 44 form a channel 49. The cores 44 are arranged circumferentially around the stator assembly to form an inwardly facing channel 49. One or more electrically conductive coils 50 passes through the channel 49 to form a continuous ring around the outer circumference of the segmented blade ring. Multiple coils 50 can provide channels and separate electrical phases of the generator output. The inwardly facing channel 49 is disposed in such a way that the blade tips 42 that form the blade ring pass adjacent to the channel 49 that encompasses the phase coil or coils 50 during operation of the electric machine 37, with excitation, thereby inducing electrical current in each coil 50.

As indicated in FIG. 3, the cores 44 are spaced circumferentially around the stator coil 50. The coil 50 and plurality of stator cores 44 are stationary, and therefore depend on the rotation of the plurality of blades 40 to provide power generation. The stator cores 44 are disposed such that coil 50 rests inside the inwardly facing channel 49 of the cores 44. The blade tips 40 pass adjacent to the inwardly facing channel 49 when the fan 12 rotates.

Individual stator cores 44 are positioned to straddle a single coil 50 indicated by a broken line in FIG. 2. The individual stator cores 44 are disposed circumferentially around the fan assembly 12 and blades 40 to allow the blade tips 42 to pass adjacent to the inwardly facing channel 49 in the cores and adjacent to the coil 50. As the blades 40 rotate, the rotor poles 38 pass adjacent to the inwardly facing channels 49, and the coil or coils 50. The movement of the poles 38 past the coil 50 and the cores 44 cause a magnetic flux path to travel through the core 44, which is converted to electrical power, as described in greater detail below. (See generally, FIG. 5). More than one circumferential stator coil 50 may be used in addition to a single stator coil 50.

Figure 4:
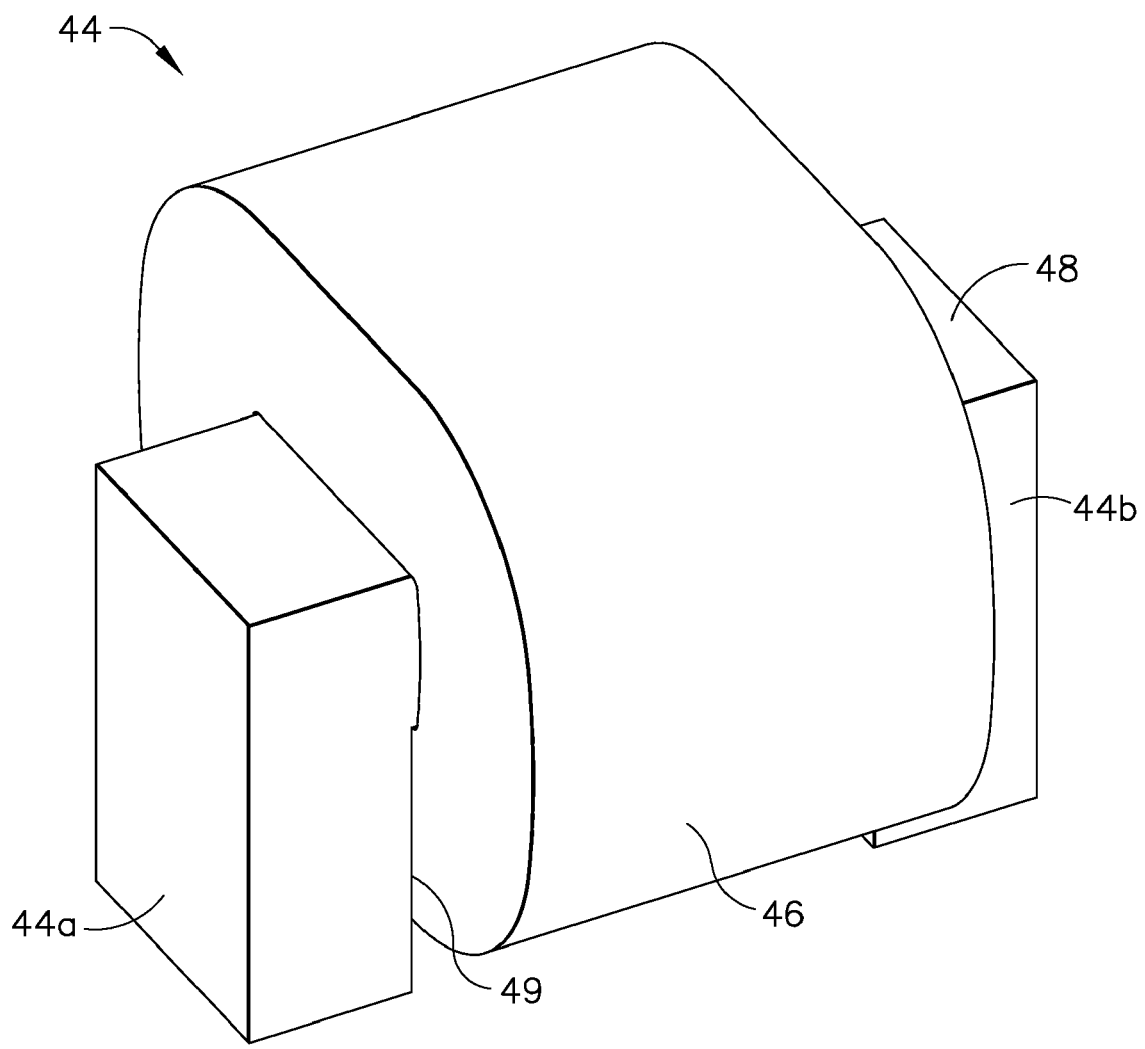
FIG. 4 is a schematic representation of an individual stator core with individual coil windings.
Figure 5:
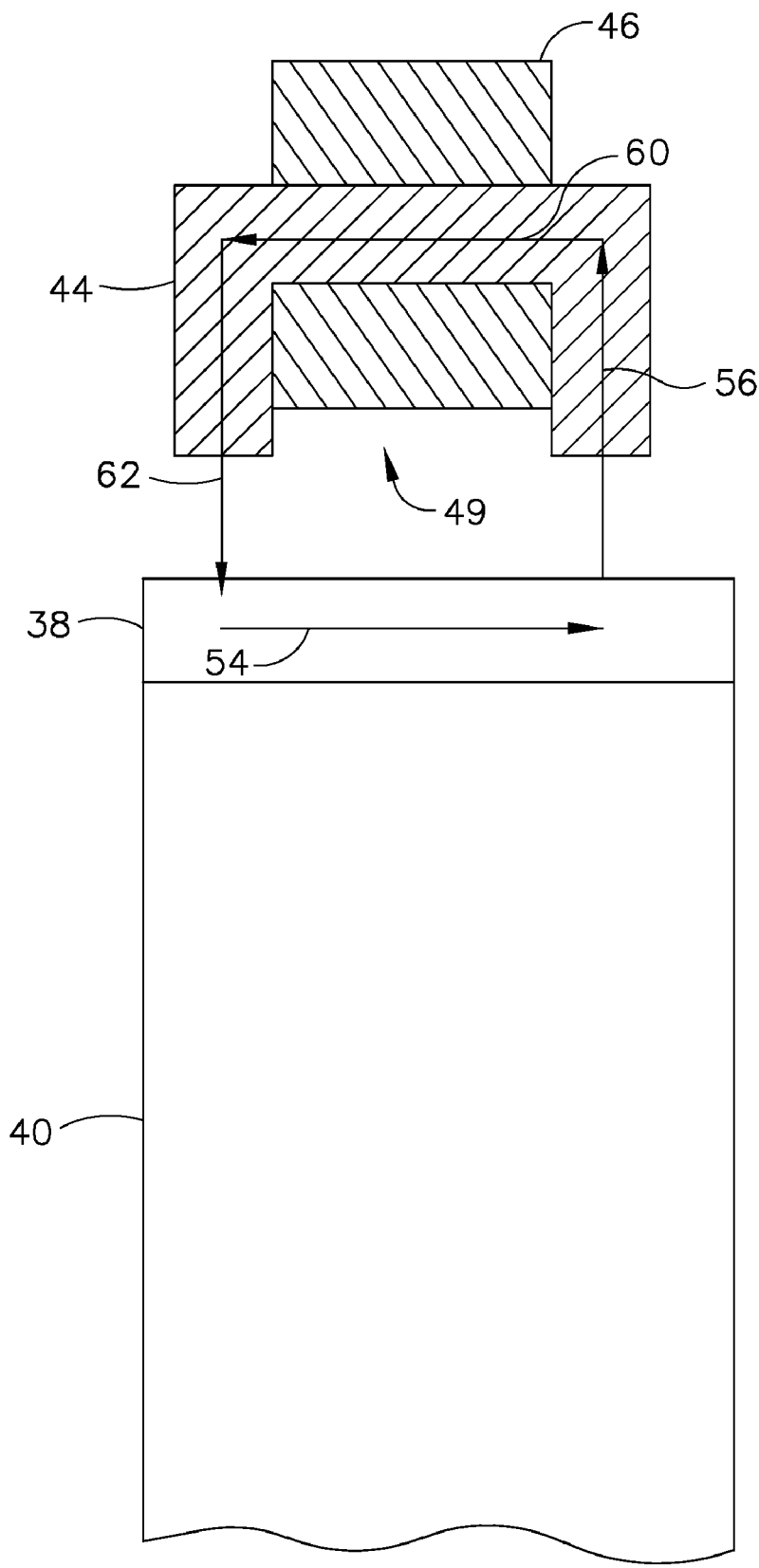
FIG. 5 is a schematic representation of the directional magnetic field induced in the stator core.

FIGS. 4 and 5 illustrate a preferred embodiment of the present invention, wherein each core portion 44 of a stator assembly includes a separate stator coil 46 wrapped around a base portion 48 of the core 44. Prior art describes a system with magnetic flux being generally axially across an airgap. The individual coil 46 includes appropriate electrical connections (not shown) allowing the individual coil 46 to be excited to create magnetic flux directed generally radially across the gap between the core 44 and the pole 38 (See generally, FIG. 5), and is only directed axially through the magnetically permeable blade tip pole or part of the stator core. As shown, each stator core 44 is horseshoe or C-shaped, and has an individual coil 46 wound around the base 48 of the core 44. The individual stator cores 44 are arranged similar to the stator cores 44 in the single coil configuration of FIG. 3, in that the stator cores 44 are disposed circumferentially around the path in which the fan blades 40 rotate, with the channel 49 directed toward the blades 40. The inwardly facing channel 49 is situated such that the rotor poles 38 pass adjacent to the channel 49 during operation of the engine. When the rotor poles 38 pass adjacent to the channel 49, a change occurs in magnetic flux in the stator core 44 and the poles 38. This change in magnetic flux induces a voltage to provide electric power in the coils 46.

As the fan or compressor operates, each individual rotor pole 38 passes each stator core 44, and its associated stator coil 46. At the point in the rotation when the poles 38 and cores 44 are aligned, a magnetic flux path is formed. The magnetic flux path in the rotor pole 38 is indicated by arrow 54, which is generally parallel to the axis of rotation of the fan 12. The flux path in the core 44 is indicated by arrows 56, 60 and 62. The magnetic flux path then traverses the air gap 52 between the core 44 and the pole 38, flows through the core arm 44b, the core base 44 and core arm 44a, again crossing air gap 52, and back into pole 38. Because the present invention applies transverse flux in the electric machine 37, the magnetic flux does not travel radially from the fan assembly, along the entire length of the fan blades as it does in operation conventional flux machines. The shortened path of the magnetic flux makes such a machine possible, where it is used to generate electrical energy.

It can be readily understood from the above description that by the movement of the poles 38 on the blades 40 relative to the coils 46, as has been described, an electric machine 37 is capable of use either as a generator or as a motor. Thus, when the engine 10 is in operation, the coils 46 or 50 can be tapped to draw power from the engine 10 in the form of electrical power. When electric machine 37 is used as a generator, a mechanical force drives the rotor 30. In the motor capacity, the coils 46 or 50 are energized, which causes the machine to rotate, e.g., to provide a starting torque for the turbine engine.

Referring to FIG. 2, the shapes of the blades 40 are shown to be rectangular with an aerodynamic twist; however, it is to be understood that the blades could be any other suitable shape as appropriate to the performance of the machine. The blades 40 are preferably shaped and situated to produce the most aerodynamic path for the blades 40, providing less stresses on the blades 40. It should be noted, however, that the blades 40 might be of any shape suitable to an engine and suitable to have poles 38 on the blade tips 42.

Figure 6:
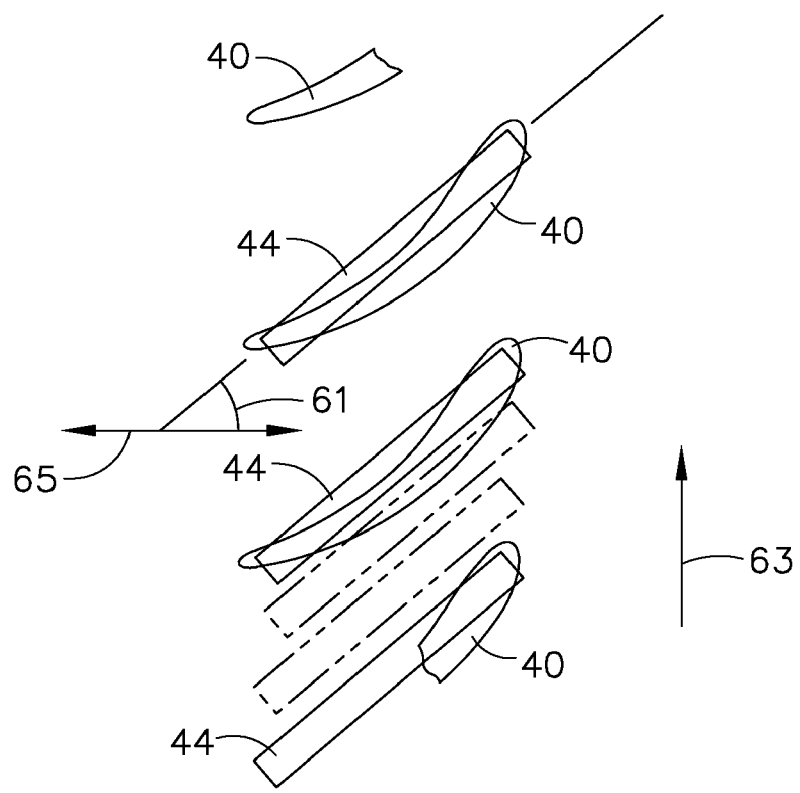
FIG. 6 is a schematic representation of a top view of the present invention illustrating the angle of the pole and rotor.
Figure 7:
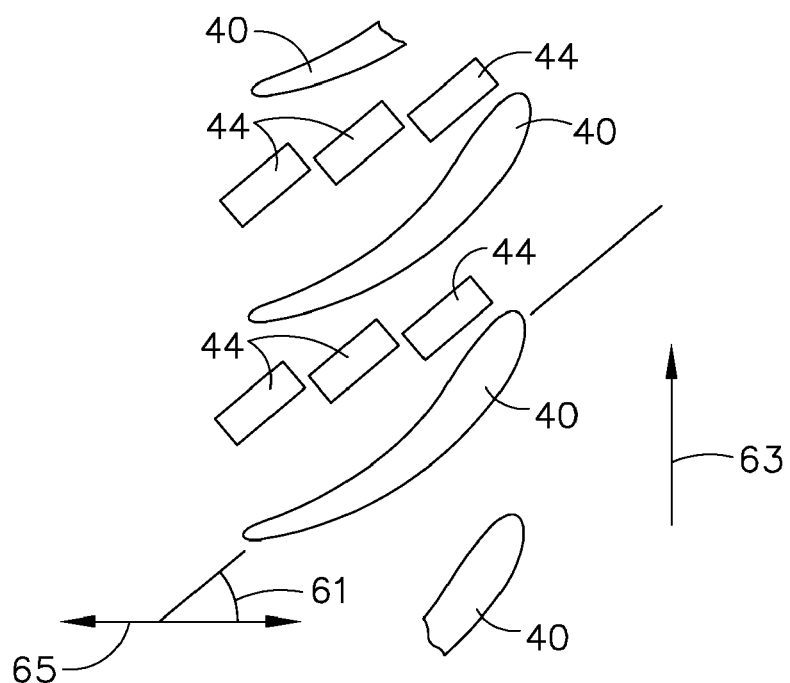
FIG. 7 is a schematic representation of a top view of an alternate embodiment of the present invention.

The novel configuration described herein allows several options previously not possible. As shown in FIGS. 6 and 7, because the flux paths can be discrete loops it is possible to make a machine from just a portion of the blade 40 circumference. This configuration also allows the construction of multiple phases in several ways not previously possible. The flux paths are discrete loops associated with individual, as opposed to multiple, coils 46. The individual coils 46 can be connected in series or parallel to form one or more phases. FIG. 6 illustrates the core elements 44 being aligned with the blades 40 and therefore, the poles 38, creating a path for a radial direction of the magnetic flux across the air gap (not shown) between the pole 38 and core elements 44, and axially through the pole 38 and portions of the core elements 44. FIG. 7 illustrates a machine having multiple rows of core elements 44 and having the blade 40 and poles 38 creating a magnetic flux path in the radial direction across the air gap (not shown). The flux path is defined between the pole 38 and core elements 44 in the radial direction, and axially through the pole 38 and portions of the core elements 44. The blades 40 are aligned at a blade deflection angle 61 such that the magnetic flux follows this described path when traveling in the direction of blade rotation 63 (See generally, FIG. 5). The deflection angle 61 is generally an acute angle to the axial direction 65.

While the invention has been described in a fan blade configuration, the electric machine 37 may also be arranged on a compressor 16, wherein the poles 38 are attached or integrated with the blades of the compressor 16, and the remaining parts of the electric machine 37 arranged as described above. In addition, the fan blade may be arranged so that less than all of the blade tips are rotor poles. This allows for flexibility to accommodate an electrical machine design that is independent of the aerodynamic requirements, e.g., the number of fan blades required for airflow may differ from the number of magnetic poles necessary in the electrical system. Further, as the blade tips are integrated with the blade, there is little additional weight associated with the modified blade tip, so little additional centrifugal or other forces are created on the blade ring. This configuration (not shown) still provides the electric power required for the system, but does not involve each and every blade tip in the system.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements with insubstantial differences from the literal languages of the claims.

What is claimed is:

1. A blade tip electric machine comprising:
   a rotary blade arrangement, the rotary blade arrangement being configured with a plurality of blades;
   a plurality of rotor pole elements, each rotor pole element of the plurality of rotor pole elements being disposed on a distal end of one of the plurality of blades;
   a plurality of magnetically permeable stator core elements, each stator core element of the plurality of stator core elements having a slot and being circumferentially spaced around at least a portion of a circumferential perimeter of the plurality of blades;
   at least one coil element disposed within one slot of the plurality of stator core elements;
   an airgap disposed between the rotor pole elements and the plurality of magnetically permeable stator core elements; and
   wherein the rotary blade arrangement has a spinning motion and wherein the plurality of rotor elements pass adjacent to the plurality of stator elements thereby causing a change in magnetic flux and generating electric power in the at least one coil element, wherein the magnetic flux generated travels substantially radially across the airgap and substantially axially across the plurality of rotor pole elements or portions of the plurality of magnetically permeable stator core elements.

2. The machine of claim 1 wherein the at least one coil element comprises a continuous loop disposed circumferentially around the rotating blade ring.

3. The machine of claim 2 wherein each stator core element of the plurality of stator core elements are disposed to straddle the at least one coil element.

4. The machine of claim 1 wherein the at least one coil element is disposed around a center of one stator core element of the plurality of stator core elements.

5. The machine of claim 1 wherein the electric machine is configured to drive a low-pressure spool of the gas turbine engine.

6. The machine of claim 1 wherein the electric machine is configured to drive a high-pressure spool of the gas turbine engine.

7. The machine of claim 1 wherein the electric machine is configured to extract energy from the low-pressure spool of the gas turbine engine.

8. The machine of claim 1 wherein the electric machine is configured to extract energy from the high-pressure spool of the gas turbine engine.

9. The machine of claim 1 wherein the plurality of stator core elements are disposed and circumferentially spaced substantially around a circumferential perimeter of the plurality of blades.

10. The machine of claim 1 wherein the plurality of stator core elements are disposed and circumferentially spaced in an arc segment on a circumferential perimeter of the plurality of blades.

11. The machine of claim 1 wherein the rotating blade ring is selected from the group consisting of a fan blade and a compressor blade.

12. The machine of claim 1 wherein each stator core element of the plurality of stator core elements are substantially shaped in a horseshoe shape wherein the first arm segment and second arm segment are substantially parallel and the base segment is substantially perpendicular to the first and second arm segments and is dispose to connect the first and second arm segments.

13. A gas turbine engine comprising:
  at least one compressor, a combustor, a high pressure turbine and a low pressure turbines arranged in serial flow communication and disposed about a longitudinal shaft of the engine within an annular outer casing; the at least one compressor driven by the high pressure and low pressure turbines and compressor air during operation; and
  a blade tip electrical machine disposed within the annular outer casing, the blade tip electrical machine comprising:
    a rotary blade arrangement, the rotary blade arrangement being configured with a plurality of blades;
    a plurality of rotor pole elements, each rotor pole element of the plurality of rotor pole elements being disposed on a distal end of one of the plurality of blades;
    a plurality of magnetically permeable stator core elements, each stator core element of the plurality of stator core elements having a slot and being circumferentially spaced around at least a portion of a circumferential perimeter of the plurality of blades;
    at least one coil element disposed within one slot of the plurality of stator core elements;
    an airgap disposed between the rotor pole elements and the plurality of magnetically permeable stator core elements; and
  wherein the rotary blade arrangement has a spinning motion and wherein the plurality of rotor elements pass adjacent to the plurality of stator elements thereby causing a change in magnetic flux and generating electric power in the at least one coil element, wherein the magnetic flux generated travels substantially radially across the airgap and substantially axially across the plurality of rotor pole elements or portions of the plurality of magnetically permeable stator core elements.

14. The engine of claim 13 wherein the electric machine is configured to drive a low-pressure spool of the gas turbine engine.

15. The engine of claim 13 wherein the electric machine is configured to drive a high-pressure spool of the gas turbine engine.

16. The engine of claim 13 wherein the electric machine is configured to extract energy from the low-pressure spool of the gas turbine engine.

17. The engine of claim 13 wherein the electric machine is configured to extract energy from the high-pressure spool of the gas turbine engine.

* * * * *